US012632270B2

(12) United States Patent
Jing et al.

(10) Patent No.: US 12,632,270 B2
(45) Date of Patent: May 19, 2026

(54) APPLICATION DISPLAY METHOD AND ELECTRONIC DEVICE

(71) Applicant: Petal Cloud Technology Co., Ltd., Dongguan City (CN)

(72) Inventors: Ke Jing, Nanjing (CN); Defeng Bu, Nanjing (CN); Yaya Dai, Nanjing (CN)

(73) Assignee: Petal Cloud Technology Co., Ltd., Dongguan City (CN)

( * ) Notice: Subject to any disclaimer, the term of this patent is extended or adjusted under 35 U.S.C. 154(b) by 120 days.

(21) Appl. No.: 18/549,118

(22) PCT Filed: Mar. 8, 2022

(86) PCT No.: PCT/CN2022/079685
§ 371 (c)(1),
(2) Date: Sep. 5, 2023

(87) PCT Pub. No.: WO2022/188766
PCT Pub. Date: Sep. 15, 2022

(65) Prior Publication Data
US 2024/0152366 A1      May 9, 2024

(30) Foreign Application Priority Data

Mar. 10, 2021      (CN) .......................... 202110262314.9

(51) Int. Cl.
*G06F 9/451*          (2018.01)
*G06F 3/0481*        (2022.01)
*G06F 8/38*           (2018.01)
(52) U.S. Cl.
CPC ............ *G06F 9/451* (2018.02); *G06F 3/0481* (2013.01); *G06F 8/38* (2013.01)

(58) Field of Classification Search
CPC ........... G06F 9/451; G06F 3/0481; G06F 8/38
See application file for complete search history.

(56) References Cited

U.S. PATENT DOCUMENTS 9,513,763 B1 * 12/2016  Adams .............. H04M 1/72454
9,953,009 B1 *  4/2018  Behar ................... G06F 40/106
(Continued)

FOREIGN PATENT DOCUMENTS

CN          102890632 A       1/2013
CN          105912318 A       8/2016
(Continued)

OTHER PUBLICATIONS

Extended European Search Report in European Appln No. 22766289. 7, dated May 31, 2024, 11 pages.
(Continued)

*Primary Examiner* — William L Bashore
*Assistant Examiner* — Gregory A Distefano
(74) *Attorney, Agent, or Firm* — Fish & Richardson P.C.

(57) ABSTRACT

The method includes: A first electronic device detects a first operation; the first electronic device sends a first request message to a server based on the first operation, where the first request message includes a first identifier of a first interface, and the first interface is an interface of a first application; the first electronic device receives a first layout message that is sent by the server and that corresponds to the first identifier of the first interface, where the first layout message includes a first parameter, and the first parameter is related to a parameter of the first electronic device; and the first electronic device displays the first interface based on the first layout message.

20 Claims, 10 Drawing Sheets

(56)                    References Cited

U.S. PATENT DOCUMENTS

| | | | |
|---|---|---|---|
| 11,048,532 B1 * | 6/2021 | McNally ......... | H04N 21/25833 |
| 2002/0057281 A1 | 5/2002 | Moroo et al. | |
| 2005/0027824 A1 * | 2/2005 | Khawand ............... | H04L 67/63 |
| | | | 709/219 |
| 2010/0251146 A1 | 9/2010 | Williams | |
| 2015/0113415 A1 * | 4/2015 | Huang ................... | G06F 9/451 |
| | | | 715/735 |
| 2018/0189243 A1 * | 7/2018 | Allyn ................... | G06F 16/958 |
| 2020/0396116 A1 * | 12/2020 | Jowett ...................... | G06F 8/61 |
| 2021/0294469 A1 * | 9/2021 | Murphy ................. | G06F 9/451 |
| 2021/0409810 A1 * | 12/2021 | Li ..................... | H04N 21/4821 |

FOREIGN PATENT DOCUMENTS

| CN | 107861711 A | 3/2018 |
|---|---|---|
| CN | 108415754 A | 8/2018 |
| CN | 109074246 A | 12/2018 |
| CN | 109308199 A | 2/2019 |
| CN | 111190672 A | 5/2020 |
| CN | 111596996 A | 8/2020 |
| CN | 111736740 A | 10/2020 |

OTHER PUBLICATIONS

International Search Report and Written Opinion in International Appln. No. PCT/CN2022/079685, mailed on May 16, 2022, 17 pages (with English translation).

\* cited by examiner

Server

Electronic
device

Electronic
device 1

Layout 1

Server

Layout 2

Electronic
device 2

Layout 3

Electronic
device 3

APPLICATION DISPLAY METHOD AND ELECTRONIC DEVICE

CROSS-REFERENCE TO RELATED APPLICATIONS

This application is a national stage of International Application No. PCT/CN2022/079685, filed on Mar. 8, 2022, which claims priority to Chinese Patent Application No. 202110262314.9, filed on Mar. 10, 2021. Both of the aforementioned applications are hereby incorporated by reference in their entireties.

TECHNICAL FIELD

This application relates to the field of terminal technologies, and in particular, to an application display method and an electronic device.

BACKGROUND

Currently, after an application on an electronic device is downloaded, the application may store a plurality of layouts such as a layout 1, a layout 2, a layout 3, . . . , and a layout N developed by a layout developer. Content, a size, and the like of each layout are fixed. For example, the layout 1 displays a slidable video link, the layout 2 displays five icons and corresponding icon names, and the layout 3 is a graphic list that supports horizontal sliding.

When the electronic device requests a layout from a server, the server may deliver layout information to a client. The layout information carries a name of a layout used in a corresponding position. For example, the electronic device pre-stores a developed screen layout. It is assumed that a screen layout includes a layout 1, a layout 2, and a layout 3. When the electronic device requests the screen layout from the server, an example of layout information delivered by the server to the electronic device may be as follows:

```
{"Position 1": "Layout 1",
"Position 2": "Layout 2",
"Position 3": "Layout 3"
}
```

In other words, positions of the layout 1, the layout 2, and the layout 3 are respectively as follows: The layout 1 is placed in the position 1, the layout 2 is placed in the position 2, and the layout 3 is placed in the position 3. For example, as shown in FIG. 1A, after receiving names of the three layouts, the electronic device displays the three layouts in corresponding positions of the screen based on the stored layouts.

For a current layout manner, the server can only select a layout from a limited layout set. If a new layout is required, the layout developer needs to develop a new layout, and needs to update the application, so that the new layout is available.

SUMMARY

This application provides an application display method and an electronic device, to improve display flexibility of an application and improve user experience.

According to a first aspect, this application provides an application display method. The method may be applied to a first electronic device, and the method may specifically include: The first electronic device detects a first operation; the first electronic device sends a first request message to a server based on the first operation, where the first request message includes a first identifier of a first interface, and the first interface is an interface of a first application; the first electronic device receives a first layout message that is sent by the server and that corresponds to the first identifier of the first interface, where the first layout message includes a first parameter, and the first parameter is related to a parameter of the first electronic device; and the first electronic device displays the first interface based on the first layout message.

According to the technical solution, an electronic device may send a request message to the server based on an identifier of an interface, so that the server can send a corresponding layout message to the server based on the identifier of the interface. In addition, the layout message may include a parameter related to the parameter of the first electronic device. Therefore, the electronic device may display the interface based on a parameter of the electronic device, for example, screen information of the electronic device, and does not need to display the interface based on a layout with a fixed size and a fixed style that is stored in an application, thereby improving display flexibility of the application and improving user experience.

In a possible design, the first parameter includes at least one of the following parameters: a control type, a control width, a control height, a control border width, a page layout direction, a user interface UI mode, a font scaling ratio, and a control position.

According to the technical solution, the layout message received by the electronic device may include a control type (for example, a control is a rectangular box) and a control style, for example, may include a width, a height, and a border width of the control, so that the electronic device may draw the control based on the parameters.

In a possible design, the parameter of the first electronic device includes at least one of the following parameters: a screen width, a screen height, a left margin of a screen, and a right margin of the screen.

According to the technical solution, the layout message received by the electronic device may include a parameter related to the parameter of the electronic device for example, a screen width, a screen height, and left and right margins of the electronic device. Therefore, the electronic device may obtain a layout message that matches the screen information of the electronic device, thereby improving user experience.

In a possible design, that the first electronic device displays the first interface based on the first layout message includes:

The first electronic device obtains the parameter of the first electronic device; the first electronic device obtains a second layout message based on the first layout message and the parameter of the first electronic device; and the first electronic device displays the first interface based on the second layout message.

According to the foregoing technical solution, the electronic device may obtain a parameter related to the electronic device, and then update the layout message based on the obtained parameter, to obtain an actual layout message that matches the screen information of the electronic device, so that an application interface can be displayed based on the actual layout message.

In a possible design, the first operation is an operation of opening the first application or a tap operation performed on a first link in a first application interface.

According to the technical solution, a user may open the application or tap a link in an application interface, to send a request message to the server, so that the server delivers a corresponding layout message.

It should be noted that a parameter of the first layout message may include a variable, or may include a constant (fixed value).

In a possible design, the first layout message further includes a second parameter; and the second parameter is a variable. The method further includes: The first electronic device assigns a value to the second parameter; the first electronic device obtains the second layout message based on the second parameter; and the first electronic device displays the first interface based on the second layout message.

According to the technical solution, the electronic device may assign the value to the second parameter, and then display a user interface based on the parameter to which the value is assigned.

In a possible design, the first layout message further includes a third parameter; and the third parameter is a parameter with a fixed value. The method further includes: the second layout message includes the third parameter; and the first electronic device displays the first interface based on the second layout message.

According to the technical solution, when a parameter in the layout message includes a parameter with a fixed value, the electronic device may display the user interface based on the fixed value.

According to a second aspect, this application provides an application display method. The method may be applied to a server, and the method may specifically include: A server receives a first request message sent by a first electronic device, where the first request message includes a first identifier of a first interface, and the first interface is an interface of a first application; and the server sends, to the first electronic device, a first layout message corresponding to the first identifier of the first interface, where the first layout message includes a first parameter, and the first parameter is related to a parameter of the first electronic device.

According to the foregoing technical solution, the server may deliver a layout message to an electronic device, and a parameter in the layout message is related to a parameter of the electronic device. Therefore, after receiving the layout message, the electronic device may obtain an actual layout message based on the parameter of the electronic device, and display an interface based on the actual layout message.

In a possible design, the first parameter includes at least one of the following parameters: a control type, a control width, a control height, a control border width, a page layout direction, a user interface UI mode, a font scaling ratio, and a control position.

In a possible design, the parameter of the first electronic device includes at least one of the following parameters: a screen width, a screen height, a left margin of a screen, and a right margin of the screen.

In a possible design, before the server sends, to the first electronic device, the first layout message corresponding to the first identifier of the first interface, the method further includes:

The server obtains the first layout message; and the server pre-stores the first layout message in the server based on the first identifier of the first interface.

According to the technical solution, a layout developer may upload and save a developed layout to the server in advance. When the electronic device requests a layout from the server, the server may obtain a layout message from the saved layout based on an identifier of an interface, and then send the layout message to the electronic device.

In a possible design, a format of the first layout message is a JavaScript object notation JSON format or an extensible markup language XML format.

According to the technical solution, the layout developer may represent information related to a screen size of a device in a form of an expression or a variable. Therefore, when delivering layouts to electronic devices of different screen types, the server may deliver a same layout to the electronic devices of different screen types, so that different electronic devices dynamically adjust the layout based on screen sizes of the electronic devices, and there is no need to deliver a type of layout for each screen type. Therefore, the server does not need to store a layout for each screen type, to improve resource utilization.

According to a third aspect, this application provides an application display method. The method may be applied to an application display system, and the method may specifically include: A first electronic device detects a first operation; the first electronic device sends a first request message to a server based on the first operation, where the first request message includes a first identifier of a first interface, and the first interface is an interface of a first application; the server receives the first request message sent by the first electronic device, and generates a first layout message based on the first request message, where the first layout message includes a first layout text, and the first layout text is associated with the first identifier; the server sends the first layout message to the first electronic device, where the first layout message includes a first parameter, and the first parameter is related to a parameter of the first electronic device; the first electronic device receives the first layout message; and the first electronic device displays the first interface based on the first layout message.

In a possible design, the first parameter includes at least one of the following parameters: a control type, a control width, a control height, a control border width, a page layout direction, a user interface UI mode, a font scaling ratio, and a control position.

In a possible design, the parameter of the first electronic device includes at least one of the following parameters: a screen width, a screen height, a left margin of a screen, and a right margin of the screen.

In a possible design, before the server sends, to the first electronic device, the first layout message corresponding to the first identifier of the first interface, the method further includes:

The server obtains the first layout text; and the server pre-stores the first layout text in the server based on the first identifier.

In a possible design, a format of the first layout message is a JavaScript object notation JSON format or an extensible markup language XML format.

In a possible design, the method further includes:

A second electronic device detects a second operation; the second electronic device sends a third request message to the server based on the second operation, where the third request message includes a second identifier of a second interface, and the second operation is an operation of opening a first application in the second electronic device; the server receives the third request message sent by the second electronic device, and generates a third layout message based on the third request message, where the third layout message includes a first layout text, and the first layout text is associated with the second identifier; the server sends the third layout message to the second electronic device, where the third layout message includes a second parameter, the second parameter is related to a parameter of the second electronic device, and the second parameter is the same as the first parameter; the second electronic device receives the third layout message; and the second electronic device displays the second interface based on the third layout message.

According to a fourth aspect, this application further provides an application display system. The system may include a first electronic device and a server.

The first electronic device is configured to: detect a first operation; send a first request message to the server based on the first operation, where the first request message includes a first identifier of a first interface, and the first interface is an interface of a first application; receive a first layout message that is sent by the server and that corresponds to the first identifier of the first interface, where the first layout message includes a first parameter, and the first parameter is related to a parameter of the first electronic device; and display the first interface based on the first layout message.

The server is configured to: receive the first request message sent by the first electronic device, and send, to the first electronic device, the first layout message corresponding to the first identifier of the first interface.

In a possible design, the system further includes a second electronic device. The second electronic device is configured to: detect a second operation; send a third request message to the server based on the second operation, where the third request message includes a second identifier of a second interface, and the second operation is an operation of opening a first application in the second electronic device; receive a third layout message that is sent by the server and that corresponds to the second identifier of the second interface, where the third layout message includes a second parameter, the second parameter is related to a parameter of the second electronic device, and the second parameter is the same as the first parameter; and display the second interface based on the third layout message.

According to a fifth aspect, this application further provides a first electronic device. The first electronic device includes a display; one or more processors; one or more memories; one or more sensors; a plurality of applications; and one or more computer programs. The one or more computer programs are stored in the one or more memories, and the one or more computer programs include instructions. When the instructions are invoked and executed by the one or more processors, the first electronic device is enabled to perform the technical solution in any one of the first aspect and the possible designs of the first aspect.

According to a sixth aspect, this application further provides a first electronic device. The first electronic device includes a module/unit that performs the method in any one of the first aspect and the possible designs of the first aspect. These modules/units may be implemented by using hardware, or may be implemented by executing corresponding software by using hardware.

According to a seventh aspect, this application further provides a server. The server includes one or more processors; one or more memories; one or more sensors; and one or more computer programs. The one or more computer programs are stored in the one or more memories, and the one or more computer programs include instructions. When the instructions are invoked and executed by the one or more processors, the server is enabled to perform the technical solution in any one of the second aspect and the possible designs of the second aspect.

According to an eighth aspect, this application further provides a server. The server includes a module/unit that performs the method in any one of the second aspect and the possible designs of the second aspect. These modules/units may be implemented by using hardware, or may be implemented by executing corresponding software by using hardware.

According to a ninth aspect, an embodiment of this application further provides a chip. The chip is coupled to a memory in a first electronic device, to execute the technical solution in any one of the first aspect and the possible designs of the first aspect of embodiments of this application. In this embodiment of this application, "coupling" means that two components are directly or indirectly combined with each other.

According to a tenth aspect, an embodiment of this application further provides a chip. The chip is coupled to a memory in a server, to execute the technical solution in any one of the second aspect and the possible designs of the second aspect of embodiments of this application. In this embodiment of this application, "coupling" means that two components are directly or indirectly combined with each other.

According to an eleventh aspect, an embodiment of this application further provides a computer-readable storage medium. The computer-readable storage medium includes a computer program. When the computer program runs on a first electronic device, the first electronic device is enabled to execute the technical solution in any one of the first aspect and the possible designs of the first aspect of embodiments of this application.

According to a twelfth aspect, an embodiment of this application further provides a computer-readable storage medium. The computer-readable storage medium includes a computer program. When the computer program runs on a server, the server is enabled to execute the technical solution in any one of the second aspect and the possible designs of the second aspect of embodiments of this application.

According to a thirteenth aspect, an embodiment of this application further provides a computer program product. When the computer program product runs on a first electronic device, the first electronic device is enabled to execute the technical solution in any one of the first aspect and the possible designs of the first aspect of embodiments of this application.

According to a fourteenth aspect, an embodiment of this application further provides a computer program product. When the computer program product runs on a server, the server is enabled to execute the technical solution in any one of the second aspect and the possible designs of the second aspect of embodiments of this application.

For each of the third aspect to the fourteenth aspect and a technical effect that may be achieved in each aspect, refer to the description of the technical effect that may be achieved in each possible solution of the first aspect and the second aspect. Details are not described herein again.

DESCRIPTION OF EMBODIMENTS

The following describes technical solutions in embodiments of this application in detail with reference to the accompanying drawings in the following embodiments of this application.

Currently, an application on an electronic device becomes more complex. If the application has a new function, a user is reminded to update the application. The new function can be used only after the application is updated. In this manner, problems such as too long downloading and updating process of an application and slow service go-online process may occur. Therefore, a dynamic technology gradually emerges. In the dynamic technology, when a new function emerges, the user does not need to update the application, and an updated interface layout can be seen only after the application is reopened.

The following describes a specific implementation solution of the dynamic technology in the conventional technology with reference to an application scenario.

Figure 1A:
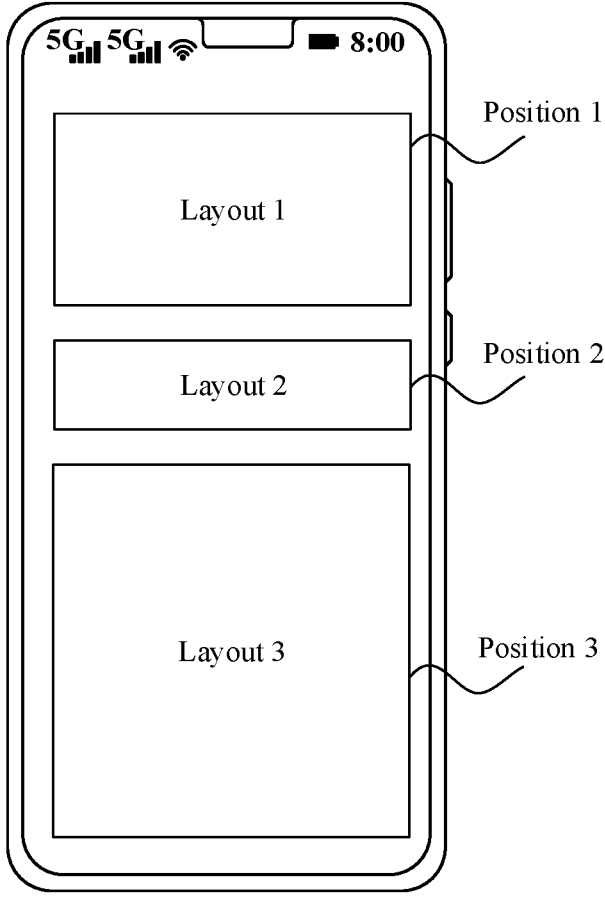
FIG. 1A is a schematic diagram of a user interface according to an embodiment of this application.
Figures 1B, 1C:
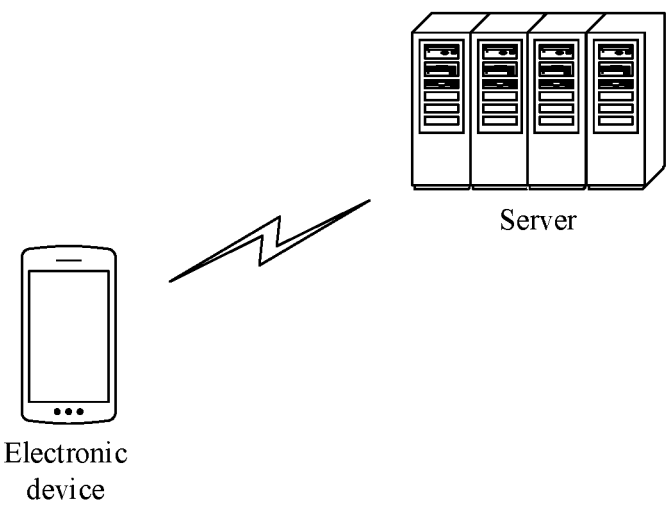
FIG. 1B is a schematic diagram of an application scenario according to an embodiment of this application.
FIG. 1C is a schematic diagram of interaction between a server and a client according to an embodiment of this application.

FIG. 1B is a schematic diagram of an application scenario according to an embodiment of this application. The application scenario may include an electronic device (also referred to as a client) and a server. The electronic device may request a layout from the server, and the server may deliver the layout to the client based on the request of the electronic device. It should be noted that the server in this embodiment of this application may be a single server, or may be a server cluster. This is not specifically limited in this application.

It should be noted that, in this embodiment of this application, the electronic device and the server may be interconnected through a communications network. The communications network may be a local area network, or may be a wide area network transferred by using a relay device. When the communications network is a local area network, for example, the communications network may be a short-range communications network such as a wireless fidelity (Wi-Fi) hotspot network, a wireless fidelity peer-to-peer (Wi-Fi P2P) network, a Bluetooth network, a zigbee network, or a near field communication (NFC) network. When the communications network is a wide area network, for example, the communications network may be a 3rd generation mobile communication technology (3G) network, a 4th generation mobile communication technology (4G) network, a 5th generation mobile communication technology (5G) network, a future communication technology such as a 6th generation (6G) network, a future evolved public land mobile network (PLMN), or the Internet.

Specifically, an application display method in the conventional technology may include the following solution: A layout developer develops different layouts for different screens, and then a server saves the different layouts for different screens. In a schematic diagram shown in FIG. 1B, a plurality of applications may be installed on an electronic device, for example, a mobile phone. When a user opens an application or opens a page in the application, a layout request message may be sent to a server. The layout request message may carry a screen type of the electronic device.

Correspondingly, after receiving the layout request message sent by the electronic device, the server may deliver, to the electronic device, a layout file corresponding to the screen type of the electronic device. In other words, the server delivers different layout files for different screen types. For example, referring to FIG. 1C, it is assumed that a screen type of an electronic device 1 is a screen 1, a screen type of an electronic device 2 is a screen 2, and a screen type of an electronic device 3 is a screen 3. The server may deliver, to the electronic device 1, a layout file corresponding to the screen 1, for example, a layout 1, deliver, to the electronic device 2, a layout 2 corresponding to the screen 2, and deliver, to the electronic device 3, a layout 3 corresponding to the screen 3. It should be understood that sizes of the layout 1, the layout 2, and the layout 3 are preconfigured by the layout developer. In other words, the sizes have fixed values.

In recent years, there is a growing quantity of screen types of electronic devices such as a hole digging screen, a folding screen, and a curved screen. For different types of screens, different layouts need to be developed to match different screens. If the application display method in the foregoing solution is used, different layouts need to be developed for different screens. In this way, a development workload is large, and the server also occupies large storage space.

In view of this, an embodiment of this application provides a new application display method. In this method, a server may deliver same layout content to different electronic devices. The layout content may include style information of an element on a screen, and the style information may be represented in a form of a variable. Then, after receiving the layout content, the electronic device may assign a value to a variable in the layout content based on screen information of the electronic device. In this way, a solution in which one layout matches a plurality of different screens can be implemented. Therefore, there is no need to develop a type of layout for each screen, so that development costs can be reduced and space utilization of the server can be improved.

An application in this embodiment of this application is a software program that can implement one or more specific functions. Usually, a plurality of applications may be installed in the electronic device, for example, a camera application, an SMS message application, an email application, a video application, and a music application. The application mentioned in the following may be an application installed when the electronic device is delivered from a factory, or may be an application downloaded from a network or obtained from another electronic device in a process in which the user uses the electronic device.

It should be noted that the application display method provided in this embodiment of this application may be applied to any electronic device that has a display, for example, a mobile phone, a tablet computer, a wearable device (for example, a watch, a band, smart glasses, or a smart helmet), a vehicle-mounted device, an augmented reality (AR)/virtual reality (VR) device, a notebook computer, an ultra-mobile personal computer (UMPC), a netbook, and a personal digital assistant (PDA). This is not limited in this embodiment of this application. An example embodiment of the electronic device includes but is not limited to an electronic device using iOS®, Android®, Microsoft®, Harmony OS®, or another operating system.

A mobile phone is used as an example below, to describe a structure of an electronic device (also referred to as an electronic device below) in an application scenario shown in FIG. 1A.

Figure 2A:
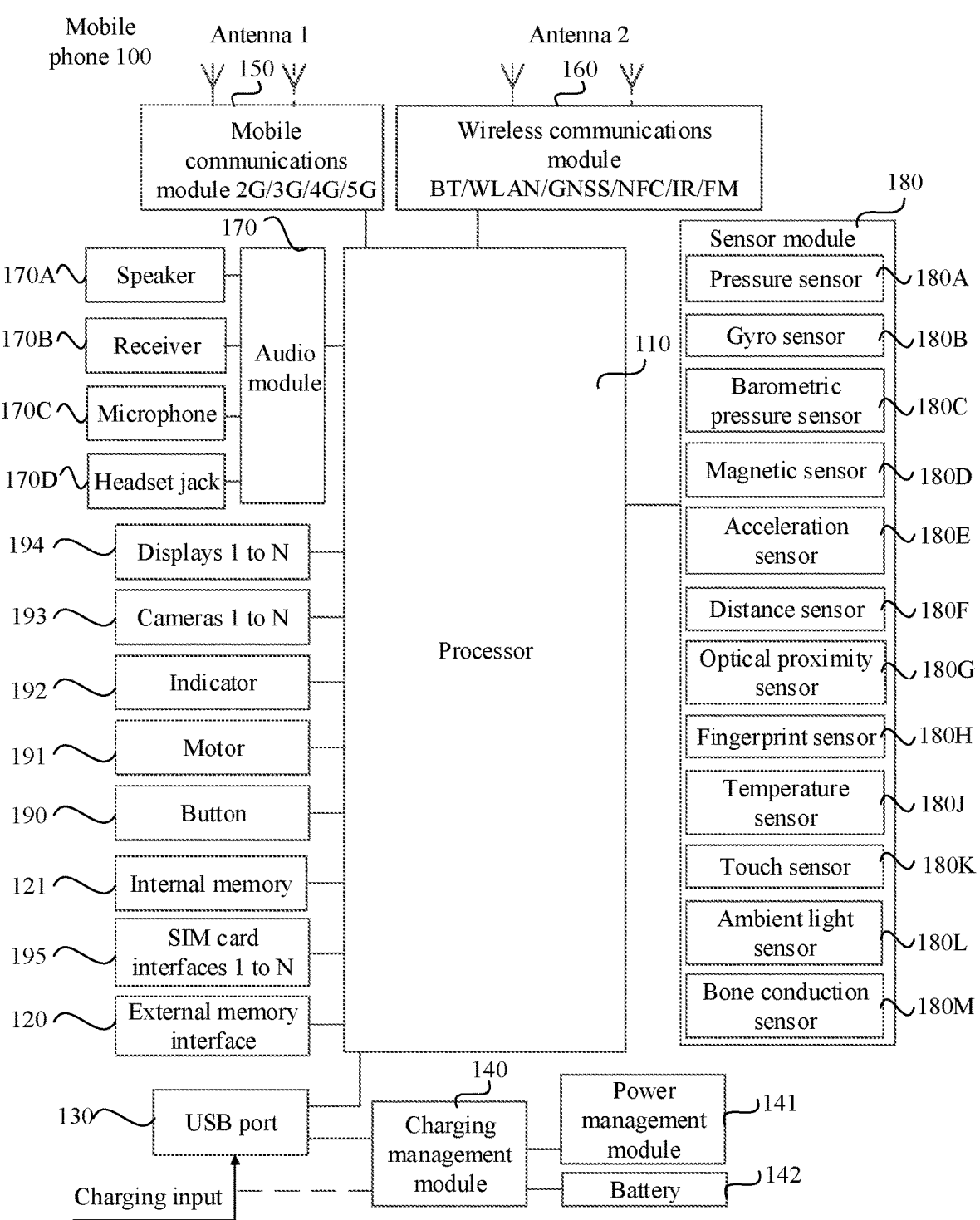
FIG. 2A is a schematic diagram of a structure of an electronic device according to an embodiment of this application.

As shown in FIG. 2A, a mobile phone 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors. The controller may be a neural center and a command center of the mobile phone 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

The USB port 130 is a port that conforms to a USB standard specification, and may be specifically a mini USB port, a micro USB port, a USB Type-C port, or the like. The USB port 130 may be configured to be connected to a charger, to charge the mobile phone 100, or may be configured to transmit data between the mobile phone 100 and a peripheral device. The charging management module 140 is configured to receive a charging input from the charger. The power management module 141 is configured to be connected to the battery 142, the charging management module 140 and the processor 110. The power management module 141 receives an input of the battery 142 and/or an input of the charging management module 140, and supplies power to the processor 110, the internal memory 121, an external memory, the display 194, the camera 193, the wireless communications module 160, and the like.

A wireless communication function of the mobile phone 100 may be implemented by using the antenna 1, the antenna 2, the mobile communications module 150, the wireless communications module 160, the modem processor, the baseband processor, and the like. The antenna 1 and the antenna 2 are configured to: transmit and receive an electromagnetic wave signal. Each antenna in the mobile phone 100 may be configured to cover a single or a plurality of communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the mobile phone 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution that includes a wireless local area network (WLAN) (for example, a Wi-Fi network), Bluetooth (BT), a global navigation satellite system (GNSS), frequency modulation (FM), NFC, an infrared technology (IR) or the like and that is applied to the mobile phone 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the mobile phone 100, the antenna 1 and the mobile communications module 150 are coupled, and the antenna 2 and the wireless communications module 160 are coupled, so that the mobile phone 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), a 5G mobile communications system, a future communications system such as a 6G system, BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194, where N is a positive integer greater than 1. In this embodiment of this application, the display 194 may be configured to display an application interface.

The camera 193 is configured to capture a static image or a video. The camera 193 may include a front-facing camera and a rear-facing camera.

The internal memory 121 may be configured to store computer-executable program code. The executable program code includes instructions. The processor 110 implements various function applications and data processing of the mobile phone 100 by running the instructions stored in the internal memory 121. The internal memory 121 may include a program storage area and a data storage area. The program storage area may store an operating system, software code of at least one application (for example, an iQIYI application or a WeChat application), and the like. The data storage area may store data (for example, an image or a video) generated in a use process of the mobile phone 100. In addition, the internal memory 121 may include a high-speed random access memory, and may further include a nonvolatile memory, for example, at least one magnetic disk storage device, a flash memory device, or a universal flash storage (UFS).

The external memory interface 120 may be configured to connect to an external storage card, for example, a micro SD card, to extend a storage capability of the mobile phone 100. The external storage card communicates with the processor 110 through the external memory interface 120, to implement a data storage function. For example, a file such as an image or a video is stored in the external storage card.

The mobile phone 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the mobile phone 100. In some embodiments, angular velocities of the mobile phone 100 around three axes (namely, x axis, y axis, and z axis) may be determined by using the gyro sensor 180B.

The gyro sensor 180B may be configured to determine a motion posture of the mobile phone 100. In some embodiments, an angular velocity of the mobile phone 100 around three axes (that is, axes x, y, and z) may be determined by using the gyro sensor 180B. The gyro sensor 180B may be configured to implement image stabilization during photographing. For example, when the shutter is pressed down, the gyro sensor 180B detects an angle at which the mobile phone 100 jitters, and calculates, based on the angle, a distance that a lens module needs to compensate for, so that the lens cancels the jitter of the mobile phone 100 through reverse motion, to implement stabilization. The gyro sensor 180B may be further used in a navigation scenario and a motion-sensing game scenario.

The barometric pressure sensor 180C is configured to measure barometric pressure. In some embodiments, the mobile phone 100 calculates an altitude based on a value of the barometric pressure measured by the barometric pressure sensor 180C, to assist in positioning and navigation. The magnetic sensor 180D includes a Hall sensor. The mobile phone 100 may use the magnetic sensor 180D to detect opening and closing of a flip cover. In some embodiments, when the mobile phone 100 is a flip phone, the mobile phone 100 may detect opening and closing of a flip cover based on the magnetic sensor 180D. Further, a feature such as automatic unlocking upon opening of the flip cover is set based on a detected opening or closing state of the flip cover. The acceleration sensor 180E may detect acceleration of the mobile phone 100 in all directions (usually, three axes), and may detect a magnitude and a direction of gravity when the mobile phone 100 is still. The acceleration sensor 180E may be further configured to identify a posture of the electronic device, and is used in an application such as switching between landscape mode and portrait mode or a pedometer.

The distance sensor 180F is configured to measure a distance. The mobile phone 100 may measure a distance by using infrared or laser light. In some embodiments, in a photographing scenario, the mobile phone 100 may use the distance sensor 180F to measure distance to implement fast focusing. The optical proximity sensor 180G may include, for example, a light-emitting diode (LED) and an optical detector, for example, a photodiode. The light-emitting diode may be an infrared light-emitting diode. The mobile phone 100 emits infrared light through the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, whether the user held the mobile phone 100 close to an ear to make a call, to automatically turn off a screen to save power. The optical proximity sensor 180G may also be used in a leather case mode or a pocket mode to automatically unlock or lock the screen.

The ambient light sensor 180L is configured to sense ambient light brightness. The mobile phone 100 may adaptively adjust brightness of the display 194 based on the perceived ambient light brightness. The ambient light sensor 180L may also be configured to automatically adjust a white balance during photographing. The ambient light sensor 180L may further cooperate with the optical proximity sensor 180G to detect whether the mobile phone 100 is in a pocket to prevent an accidental touch. The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy based on the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is less than another threshold, the mobile phone 100 heats the battery 142 to avoid abnormal shutdown of the mobile phone 100 due to a low temperature. In some other embodiments, when the temperature is less than still another threshold, the mobile phone 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the mobile phone 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button, or may be a touch button. The mobile phone 100 may receive a key input, and generate a key signal input related to a user setting and function control of the mobile phone 100. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or pulled out of the SIM card interface 195, so that the SIM card is in contact with or separated from the mobile phone 100.

It may be understood that the components shown in FIG. 2A do not constitute a specific limitation on the mobile phone. The mobile phone may further include more or fewer components than those shown in the figure, or may combine some components, or may split some components, or may have different component arrangements. In the following embodiment, the mobile phone 100 shown in FIG. 2A is used as an example for description.

A layered architecture including an event-driven architecture, a microkernel architecture, a microservice architecture, or a cloud architecture may be used for a software system of the mobile phone 100. In this embodiment of this application, an Android system with a layered architecture is used as an example to illustrate a software structure of the mobile phone 100.

Figure 2B:
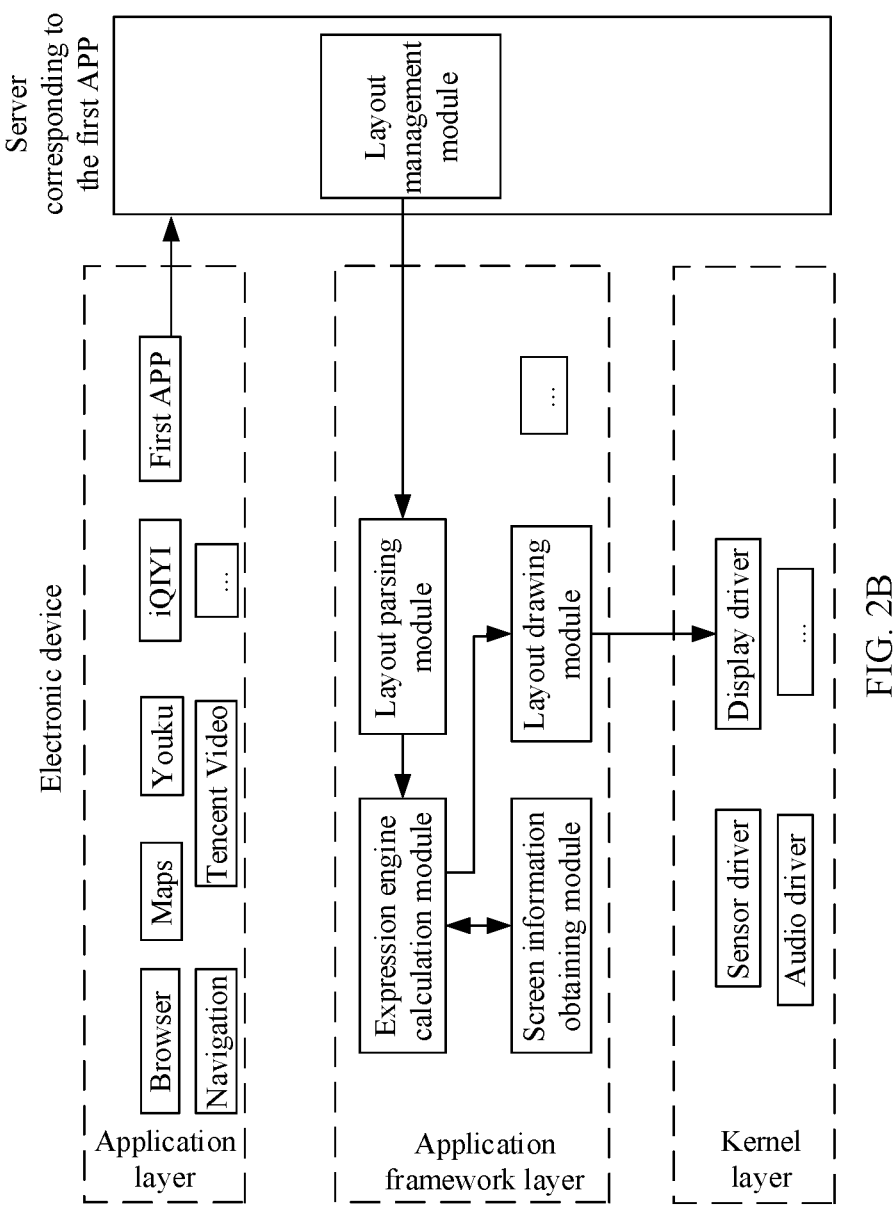
FIG. 2B is a diagram of a software structure-based data flow direction according to an embodiment of this application.

FIG. 2B is a diagram of a software structure-based data flow direction according to an embodiment of this application. In a layered architecture, software is divided into several layers, and each layer has a clear role and task. The layers communicate with each other through a software interface. In some embodiments, the Android system includes an application layer, an application framework layer, Android runtime, a system library, a kernel layer, and a hardware layer from top to bottom.

The following uses the application layer, the application framework layer, and the kernel layer as examples to describe a data flowing process in this embodiment of this application.

The application layer may include a series of application packages. As shown in FIG. 2B, applications such as a browser, Youku, Tencent Video, a map, iQIYI, TikTok, NetEase Cloud Music, and a first APP may be installed at the application layer.

The application framework layer provides an application programming interface (API) and a programming framework for an application at the application layer. The application framework layer includes some predefined functions.

As shown in FIG. 2B, the application framework layer may include a layout parsing module, an expression engine calculation module, a screen information obtaining module, and a layout drawing module. Certainly, the application framework layer may further include a display policy service, a power manager service (PMS), a display manager service (DMS), an activity manager, a window manager, a content provider, a view system, a resource manager, a notification manager, and the like.

The layout parsing module is configured to parse a layout text delivered by a server, to identify an expression in the layout text.

The expression engine calculation module is configured to: assign a value to the expression in the layout text and calculate a result. The module may directly adjust an interface size in a layout template to match different electronic devices.

The screen information obtaining module is configured to obtain device screen information of an electronic device, for example, a screen type and a screen size.

The layout drawing module is configured to perform user interface (UI) drawing on an interface based on the result calculated by the expression engine calculation module.

The kernel layer is a layer between hardware and software of the electronic device. The kernel layer includes at least a display driver, a sensor driver, a camera driver, and an audio driver, to drive hardware in the hardware layer.

In this embodiment of this application, an application at the application layer (for example, the first APP) may request a layout from a server corresponding to the first APP. After the server receives the request of the electronic device, a layout management module of the server may deliver a layout text to the application framework layer of the electronic device. After the electronic device receives the layout text, the layout parsing module at the application framework layer may parse the layout text delivered by the server, identify an expression in the layout text, and transfer the expression to the expression engine calculation module. The expression engine module identifies a variable and a formula in the expression. A value of the variable may be obtained by using the screen information obtaining module. Then, the expression engine calculation module assigns a value to the variable based on the value obtained by the screen information module, and calculates a value of the formula, so that a parameter value in the layout text can be obtained. The expression engine calculation module transfers the value of the formula to the layout drawing module, so that the layout drawing module draws a UI based on the value of the formula. Finally, the layout drawing module at the application framework layer notifies the display driver at the kernel layer of the drawn UI, so that the display driver invokes a display to display the UI.

It should be noted that the layout parsing module, the expression engine calculation module, and the layout drawing module may be located at the application framework layer, or may be located at the application layer, in other words, may be functional modules in an application. That is, a layout solution in this embodiment of this application may be a system-level capability, or may be an application capability.

An application to the architecture of the mobile phone 100 shown in FIG. 2A is used as an example for description in the following embodiments.

In addition, in the following embodiments, "at least one" includes "one or more", and "a plurality of" means "greater than or equal to two". In addition, it should be understood that, in the description of this application, words such as "first" and "second" are only used to distinguish the description.

It should be understood that a layout request message in the following may be understood as the foregoing first request message/third request message, a layout text in the following may be understood as the foregoing first layout message/third layout message, and an actual layout text may be understood as the foregoing second layout message.

Figure 3:
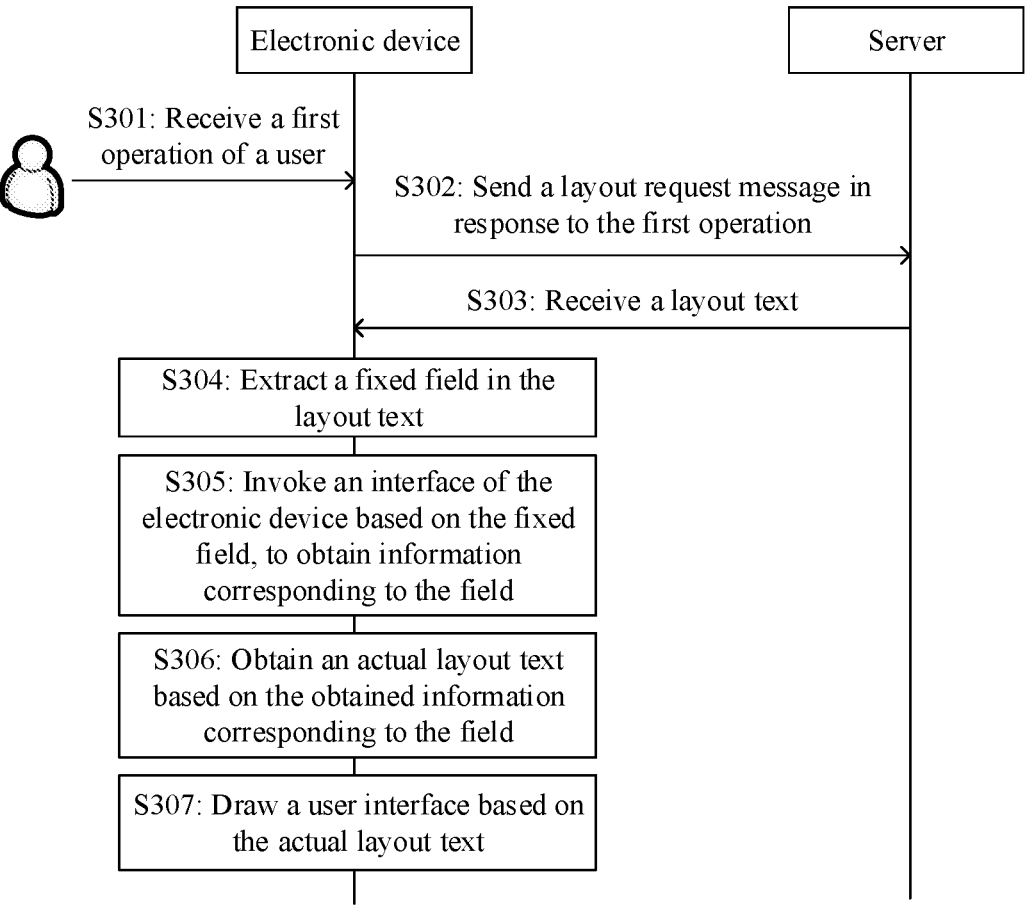
FIG. 3 is a flowchart of an application display method according to an embodiment of this application.

FIG. 3 is a flowchart of an application display method according to an embodiment of this application. Refer to FIG. 3. The method may include the following steps.

S301: An electronic device receives a first operation of a user, where the first operation is used to trigger a layout request.

The first operation herein may be a trigger operation performed by the user to open an application, or may be a trigger operation performed by the user to open an interface. For example, the first operation may be a tap operation performed by the user on an application icon, or may be a tap operation performed on an operation button in a user interface of an application. Certainly, the first operation may be a sliding operation, a double-tap operation, or the like, or may be a voice-triggered operation. This is not limited in this application.

Figure 4:
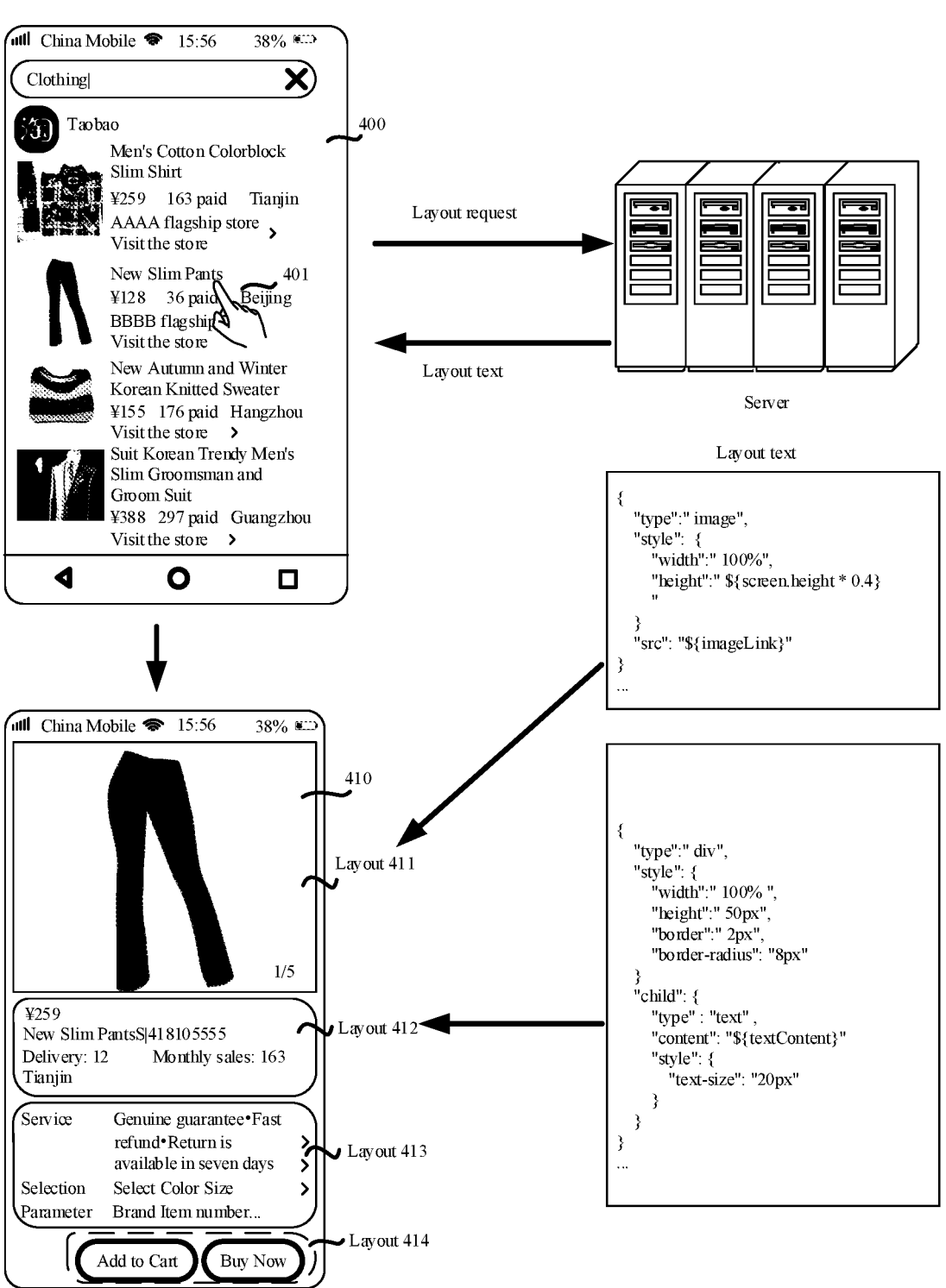
FIG. 4 is a schematic diagram of a user interface according to an embodiment of this application.

As shown in FIG. 4, it is assumed that an interface 400 of a Taobao application shown in FIG. 4 is displayed on a mobile phone, and the interface 400 may include links of a plurality of types of clothing. In this case, the user may open a link. For example, the first operation is a tap operation performed by the user on a link 401.

S302: The electronic device sends a layout request message to a server in response to the first operation.

The layout request message may carry a name of a requested layout. For example, it is assumed that in a layout development phase, a layout layout1 designed by a developer is a layout obtained after the user opens and taps the link 401. In step S301, when the user taps the link 401, the mobile phone may send the layout request message to the server in response to the first operation. The layout request message may carry a layout name layout1.

It should be noted that, in this embodiment of this application, a layout (or a layout text) is in a one-to-one correspondence with a layout name. The layout name may be set by the layout developer when the layout is developed, or may be set by the server after the layout developer uploads the layout to the server. This is not specifically limited in this application. Certainly, if the layout name is set by the server, after the server sets the layout name, the layout name may be notified to the electronic device, so that the electronic device can request a corresponding layout text by using the layout name.

S303: The electronic device receives a layout text that corresponds to the layout name and that is sent by the server.

Correspondingly, the server may receive the layout request message, and feed back, to the electronic device, the layout text corresponding to the layout name.

In this embodiment of this application, a layout developed by the layout developer does not have a fixed size, but a size, or the like is represented in a form of a variable, so that the electronic device can assign a value to the variable based on screen information of the electronic device, to match a screen of the electronic device. In other words, in this application, when a plurality of electronic devices simultaneously request a same layout from the server, layout texts delivered by the server to different electronic devices are a same layout text. In other words, the layout text delivered by the server to the electronic device is a layout template, and the electronic device may adjust a size of the template based on the screen information of the electronic device.

Figure 5:
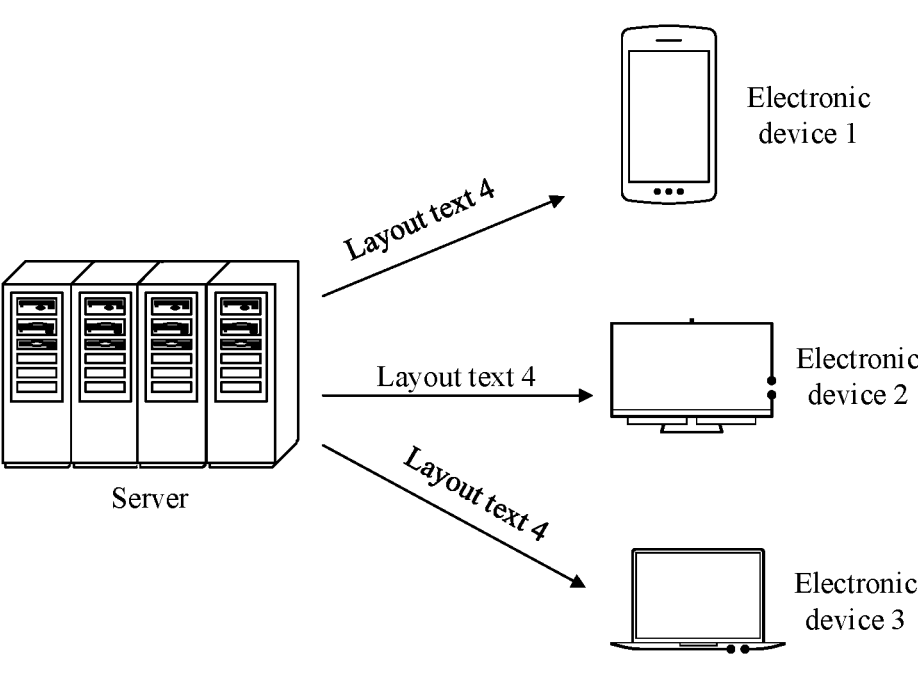
FIG. 5 is a schematic diagram of interaction between a server and an electronic device according to an embodiment of this application.

For example, as shown in FIG. 5, three electronic devices are used as an example. For example, the electronic devices include an electronic device 1, an electronic device 2, and an electronic device 3. A screen type of the electronic device 1 is a screen 1, a screen type of the electronic device 2 is a screen 2, and a screen type of the electronic device 3 is a screen 3. When the user performs a same operation on the three different electronic devices, that is, requests a same layout from the server, the server may deliver a layout text such as a layout text 4 to the electronic device 1, deliver the layout text 4 to the electronic device 2, and deliver the layout text 4 to the electronic device 3.

In other words, according to this embodiment of this application, when delivering the layout text to the electronic device, the server does not need to pay attention to a screen type of the electronic device, and does not need to develop a plurality of layouts for a plurality of electronic devices, thereby saving development costs.

FIG. 4 is still used as an example. It is assumed that the layout text delivered by the server to the mobile phone is as follows:

```
{
    "type": "image",
    "style": {
        "width": "100%",
        "height": "${screen.height*0.4}"
    }
    "src": "${imageLink}"
}
...
{
    "type": "div",
    "style": {
        "width": "100%",
        "height": "50px",
        "border": "2px",
        "border-radius: "8px"
    }
    "child": {
            "type": "text"
            "content": "${textContent}"
            "style": {
            "text-size": "20px"
            }
    }
}
```

It should be understood that the foregoing layout text is merely an example of some lines of codes, and " . . . " is only used to illustrate that more lines of text code are included in the middle. To shorten the space, only the some lines of code are shown.

The following explains the foregoing text code. Before " . . . " in the text code, an image element is defined to indicate that an image needs to be displayed. Two variables screen.height and imageLink are used; screen.height represents a current screen height; imageLink represents a network address of the image, for example, http://xx/xx.jpg; and border represents a border width. In the foregoing example, a final height of the image is obtained by multiplying the current screen height by 0.4, that is, 40% of the screen height, and a width may be a current screen width screen, width.

After " . . . " in the text code, a rounded rectangle is first declared, and then a text is placed in the rounded rectangle. A variable textContent is used for content of the text. For example, the textContent may be "New Slim Pants S1418105555".

In this embodiment of this application, the layout text may include a first parameter, and the first parameter is related to a parameter of the electronic device. For example, in the layout text, the first parameter may include a control type, a control width, a control height, and a control border width. The parameter of the electronic device may include screen.height.

It should be understood that the width, the height, the border width, and the like of the control may be understood as a control style. In addition, the control style may further include a background color, and the like. This is not limited in this application.

S304: The electronic device extracts a fixed field in the layout text.

The fixed field in the layout text may include variables in the layout text, for example, screen.height and screen.width. The layout text in FIG. 4 is used as an example. In the layout text, a fixed field may include screen.height.

S305: The electronic device invokes an interface of the electronic device based on the fixed field, to obtain information corresponding to the field.

For example, it is assumed that the fixed field is screen.height. The electronic device may invoke the interface of the electronic device to obtain information corresponding to screen.height, that is, obtain a value corresponding to a screen height of the electronic device.

S306: The electronic device obtains an actual layout text based on the obtained information corresponding to the field.

The layout text delivered by the server is a layout text that can be applied to different screens, and screens of different electronic devices may be different. Therefore, a value corresponding to a parameter in the layout text needs to be set to a value applicable to the screen of the electronic device. In other words, the electronic device may assign a value to a variable included in the parameter based on the screen information of the electronic device. In this way, the actual layout text of the electronic device may be determined. In other words, each parameter in the layout text has a corresponding value.

In a possible implementation, a parameter may be described by using an expression in this embodiment of this application. An arithmetic operation such as subtraction may exist in an expression. After a value is assigned to a variable, a value of the variable may be substituted into the expression, so that a value corresponding to a parameter that includes the variable can be obtained.

Refer to FIG. 4. The height of the image in the layout text is 40% of the screen height. It is assumed that a value of the fixed field screen.height obtained in S305 is 1920. Therefore, a display height of the image is 768 pixels. It is assumed that an obtained value of the fixed field screen.width is 400. Therefore, a display width of the image is 400 pixels. In addition, a text in the layout text is a text in a rounded rectangular box, a border radius of the rounded rectangular box is 8 pixels, a border width is 2 pixels, a height is 50 pixels, and a width is displayed at 100% of a mobile phone screen. In other words, the width is the same as a width of the mobile phone screen. Then, a text may be assigned to the variable text content, and a size of the text is 20 pixels. For example, the actual layout text is as follows:

```
{
    "type": "image",
    "style": {
        "width": "100%",
        "height": "768"
    }
    "src": "http://12/34.jpg"
}
...
{
    "type": "div",
    "style": {
        "width": "400px",
        "height": "50px",
        "border": "2px",
        "border-radius": "8px"
    }
    "child": {
        "type": "text"
        "content":" New Slim Pants S|418105555"
        "style": {
            "text-size": "20px"
        }
    }
}
```

S307: The electronic device draws a user interface based on the actual layout text.

Refer to FIG. 4. After obtaining the actual layout text, the mobile phone may perform UI drawing on the layout text. For example, a displayed user interface may be an interface 410. The interface 410 may include a layout 411, a layout 412, a layout 413, and a layout 414. It should be understood that in the layout text shown in FIG. 4, an image in the layout 411 and some texts in the layout 412 are merely an example. For an icon such as an arrow and a shopping cart in the layout 411 and a layout text of another text in the layout 412, the layout 413, and the layout 414 are similar to the layout text shown in the schematic diagram shown in FIG. 4. Details are not described herein.

In some other embodiments, when all parameters in the layout text are variables, the electronic device may assign values to the variables based on the screen information of the electronic device, to obtain the actual layout text. A specific value of the variable is not limited in this embodiment of this application. For example, it is assumed that the layout text is as follows:

```
{
    "type": "div",
    "style": {
        "width": "Xpx",
```

US 12,632,270 B2

19

-continued

```
        "height": "Ypx"
        "border": "Zpx"
      }
    }
```

After extracting the fixed field in the layout text, the electronic device may assign a value to the field based on a cosmetic degree of an actual interface, for example, assign values to X, Y, and Z in the layout text, to obtain the actual layout text.

Figure 6A:
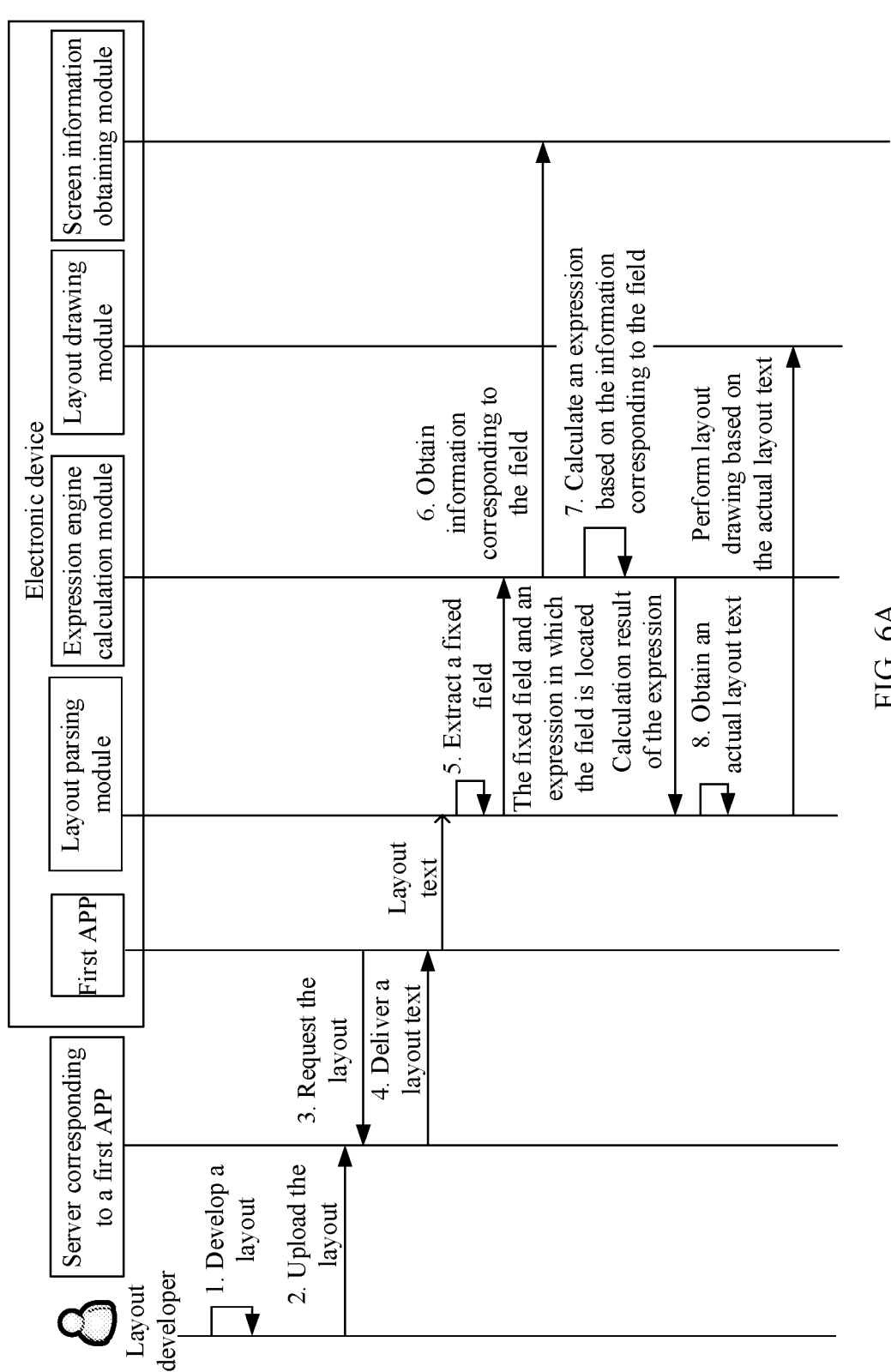
FIG. 6A is a flowchart of another application display method according to an embodiment of this application.

In some embodiments, FIG. 6A is a flowchart of another application display method according to an embodiment of this application. Refer to FIG. 6A. The method may include the following steps.

1. A Layout Developer Develops a Layout.

In this embodiment of this application, a layout development phase and a layout application phase may be included. It should be understood that the embodiment shown in FIG. 3 and FIG. 4 is an application display method in the layout application phase, and the following describes the layout development phase.

In the layout development phase, the developer designs a layout of an interface, and then represents the layout of the interface in a form of a text. In this embodiment of this application, the text may be a structured text, and may be used to describe style information such as a position and a size of a visible element on a screen.

In a possible implementation, the developer may use a text editor or a specific integrated development environment (IDE) to develop the layout. In addition, the text may be in a JavaScript object notation (JSON) format, or may be in an extensible markup language (XML) format, or the like. This is not limited in this application.

The JSON format is used as an example to describe the layout text developed by the developer. For example, the layout text is as follows:

```
  {
    "type": "div",
    "style": {
    "width": "${(display.right-n)} px ",
    "height": "30px",
    "border": "2px"
    }
  }
```

Herein, type represents a type of a current UI control, and div represents a rectangle. In other words, it indicates to draw a rectangular box on the screen. Herein, style represents a style of the current UI control, for example, a width, a height, and a background color. Specifically, width represents a width, height represents a height, border represents a border width, display. right represents a right margin of the screen, and n may be a fixed value, for example, 2.

In this example, a first parameter may include a control type, a control width, a control height, and a control border width. A parameter of the electronic device may include display. right. The width is a parameter with a variable, and the variable is display.right. The height is a parameter with a constant.

It should be understood that in the JSON format, a character string starting with $ is usually an expression, and the expression is in parenthesis { }.

The XML format is used as an example. The layout text of the layout may be the following example:

20

```
<div style="width:${(display.right-n)}px; height:30px; border: 2px">
</div>
```

The <div> label indicates that a control that needs to be drawn currently is a rectangle control, style represents a style of a current div control, and a semicolon ";" may be used to separate style information. Content of the style may be described in a form of an expression. For example, a style of width is in a form of an expression.

Content represented by the text may be: drawing a rectangular box, where a height of the rectangular box is 30 pixels, a border width is 2 pixels, and a width of a rectangle is variable (represented by using an expression).

It should be noted that the foregoing text is merely an example description, and the height and the border width may also be represented by using expressions. This is not limited in this application. That is, in the layout text, size information such as the width, the height, and the border width may be variables.

It should be understood that parameters in the foregoing examples are merely examples of a part of a layout. In this embodiment of this application, parameters in a layout are not specifically limited. For example, the parameters in the layout may further include the following parameters:

(1) Page layout direction: Configuration.layoutDircetion, usually including two types: from right to left (LTR) and from left to right (RTL).

(2) UI mode: Configuration.uiMode, usually including a dark color mode, a bright color mode, and the like.

(3) Font scaling ratio: Configuration.fontScale, usually including 1.0 and 2.0, and the like.

(4) Screen left/right (safe) margin: safedisplay.left/right, which may be applied to a curved screen. It should be understood that for the curved screen, a left margin of the screen is a bending width on a left side of a display, and a right margin of the screen is a bending width on a right side of the display. For a normal screen (or referred to as a straight screen), a left margin of the screen is a distance between a display area on the display and a left border of the electronic device, and a right margin of the screen is a distance between a display area on the display and a right border of the electronic device. Usually, a value may be set. It should be noted that the curved screen is a screen with a curved design on a left or right side of the screen.

(5) Control position: position, usually represented by using coordinates, for example, (X, Y). For example, it is assumed that the control is a rectangular box, and the control position may be coordinates corresponding to a point in an upper left corner of the rectangular box.

2. The layout developer uploads the layout to a server.

After the developer completes development of an interface layout, the developer may upload a developed layout file to the server, so that the electronic device invokes the developed layout file. It should be noted that each interface layout may correspond to a name mark. For example, each interface layout may be represented by using layout1, layout2, or the like.

3. A first APP in the electronic device requests a layout from the server.

4. The server corresponding to the first APP delivers a layout text to the first APP.

5. The first APP invokes a layout parsing module in the electronic device to extract a fixed field in the layout text, and then transfers, to an expression calculation engine module, the fixed field (display. right) and an expression (display. right-n) in which the field is located.

6. The expression engine calculation module in the electronic device obtains information corresponding to the field (display.right) from a screen information obtaining module.

7. The expression engine calculation module in the electronic device calculates the expression (display.right-n) based on the information corresponding to the field, and then returns a calculation result of (display. right-n) to the layout parsing module.

8. The layout parsing module in the electronic device obtains an actual layout text (that is, a complete style of the layout) based on the calculation result, and delivers the actual layout text to a layout drawing module in the electronic device, and the layout drawing module in the electronic device performs layout drawing.

For example, the layout text in this embodiment is used as an example, and the width is a parameter that includes a variable display.right. It is assumed that a value of the field display. right obtained by the electronic device from the screen information obtaining module is 29. For example, if a value of n is 9, the value can be substituted into the expression to calculate a width of the rectangular box width=29−9=20. Therefore, the actual layout text corresponding to the electronic device is as follows:

```
{
    "type": "div",
    "style": {
    "width": "20px"
    "height": "30px",
    "border": "2px"
    }
}
```

That is, an actual layout of the electronic device is as follows: The control is a rectangular box, and a style of the rectangular box includes: a width is 20 pixels, a height is 30 pixels, and a border width is 2 pixels.

Figure 6B:
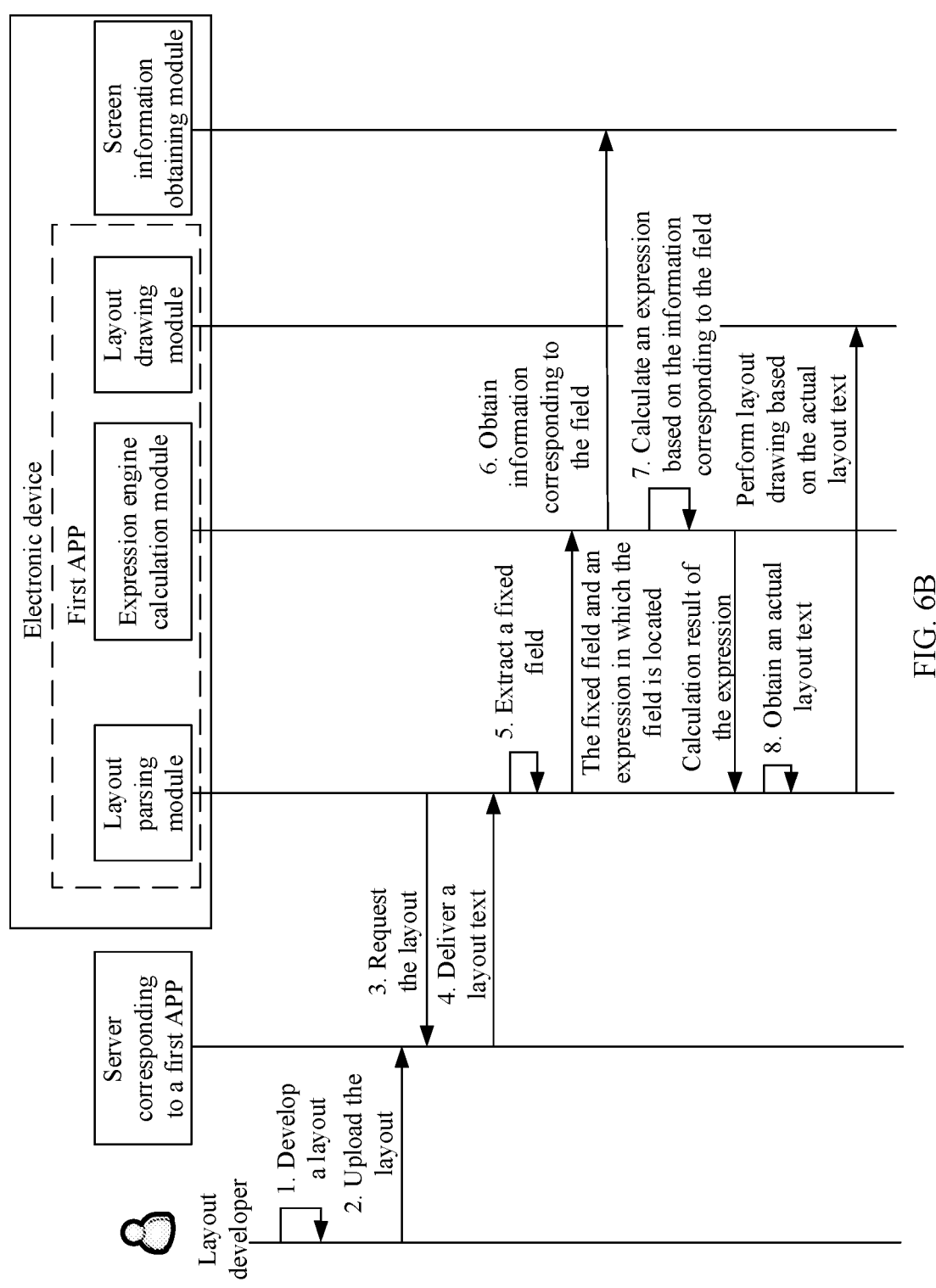
FIG. 6B is a flowchart of still another application display method according to an embodiment of this application.

In some other embodiments, FIG. 6B is a flowchart of still another application display method according to an embodiment of this application. Refer to FIG. 6B. The method may include the following steps.

1. A layout developer develops a layout.

2. The layout developer uploads the layout to a server corresponding to a first APP.

3. An electronic device requests a layout from the server corresponding to the first APP.

4. A server corresponding to the first APP delivers a layout text to the first APP.

5. A layout parsing module in the first APP extracts a fixed field (display.right) in the layout text delivered by the server corresponding to the first APP, and then transfers, to an expression calculation engine module in the first APP, the fixed field (display.right) and an expression (display. right-n) in which the field is located.

6. The expression engine calculation module in the first APP obtains information corresponding to the field from a screen information obtaining module.

7. The expression engine calculation module in the first APP calculates the expression (display. right-n) based on the information corresponding to the field, and then returns a calculation result of (display.right-n) to the layout parsing module in the first APP.

8. The layout parsing module in the first APP obtains an actual layout text (that is, a complete style of the layout) based on the calculation result, and transfers the actual layout text to a layout drawing module in the first APP, and the layout drawing module in the first APP performs layout drawing.

It should be noted that, in the scenario shown in FIG. 6A, the APP does not execute a layout, and layouts of all APPs are executed by the electronic device. In the scenario in FIG. 6B, the APP obtains data from the electronic device, and then the APP executes a layout.

It should be understood that step 3 in the schematic diagrams shown in FIG. 6A and FIG. 6B may correspond to S302 in the embodiment shown in FIG. 3, step 4 may correspond to S303 in the embodiment shown in FIG. 3, step 5 may correspond to S304 in the embodiment shown in FIG. 3, step 6 may correspond to S305 in the embodiment shown in FIG. 3, and steps 7 and 8 may correspond to S306 in the embodiment shown in FIG. 3. For a specific implementation of each functional module, refer to the description in the embodiment shown in FIG. 3. Details are not described herein again.

It should be noted that, in a possible implementation, after the layout developer uploads the completed layout to the server, the server may feed back an uploading complete message to the layout developer. Alternatively, after completing the layout drawing, the layout drawing module may feed back a drawing complete message to the layout parsing module.

In the foregoing embodiments provided in this application, the method provided in the embodiments of this application is described from a perspective of interaction between a client and a server. To implement functions in the method provided in the foregoing embodiments of this application, the electronic device may include a hardware structure and/or a software module, and implement the foregoing functions in a form of the hardware structure, the software module, or a combination of the hardware structure and the software module. Whether one of the foregoing functions is performed in a manner of a hardware structure, a software module, or a hardware structure and a software module depends on a specific application and design constraints of the technical solutions.

Figure 7:
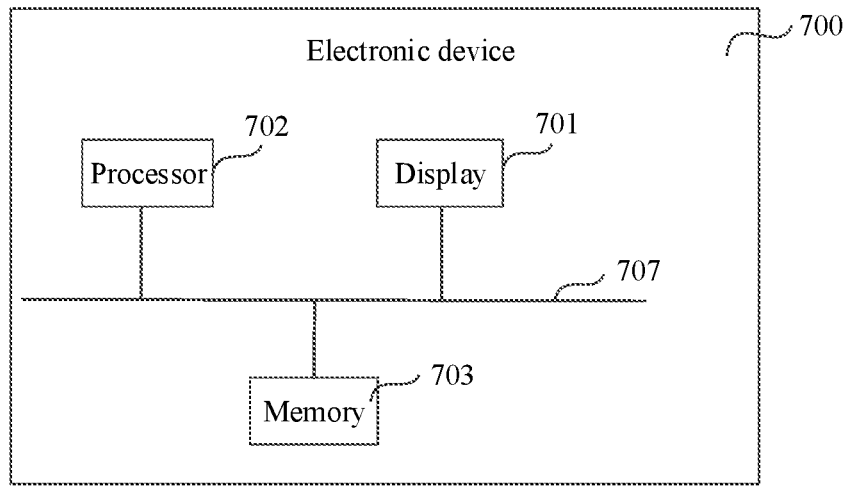
FIG. 7 is a schematic diagram of a structure of an electronic device according to an embodiment of this application.

As shown in FIG. 7, some other embodiments of this application disclose an electronic device, and the electronic device may be an electronic device with a display. Refer to FIG. 7. The electronic device 700 includes a display 701, one or more processors 702, one or more memories 703, one or more sensors 704 (not shown in the figure), a plurality of applications 705 (not shown in the figure), and one or more computer programs 706 (not shown in the figure). The foregoing components may be connected through one or more communication buses 707.

The display 701 is configured to: display a display interface of an application in the electronic device, or display prompt information. The memory 703 stores one or more computer programs, and the one or more computer programs include instructions. The processor 702 invokes the instructions stored in the memory 703, so that the electronic device 700 may perform the application display method in the foregoing embodiments.

In embodiments of this application, the processor 702 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor. The software module may be located in the memory 703. The processor 702 reads a program instruction in the memory 703, and completes the steps of the foregoing method with reference to the hardware of the processor 702.

In this embodiment of this application, the memory 703 may be a nonvolatile memory, for example, a hard disk drive (HDD) or a solid-state drive (SSD), or may be a volatile memory, for example, a RAM. The memory may alternatively be any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store instructions and/or data.

It may be clearly understood by a person skilled in the art that, for the purpose of convenient and brief description, for a detailed working process of the foregoing apparatus and unit, refer to a corresponding process in the foregoing method embodiment. Details are not described herein again.

Based on the foregoing embodiments, this application further provides an application display system. The system may include a first electronic device and a server. For example, the first electronic device may be configured to receive a first layout message that is sent by the server and that corresponds to a first identifier of a first interface. The first layout message includes a first parameter, and the first parameter is related to a parameter of the first electronic device. In addition, the first electronic device may display the first interface based on the first layout message. The server may be configured to send, to the first electronic device, the first layout message corresponding to the first identifier of the first interface.

Further, the system may further include a second electronic device. The second electronic device may be configured to receive a third layout message that is sent by the server and that corresponds to a second identifier of a second interface. The third layout message includes a second parameter, the second parameter is related to a parameter of the second electronic device, and the second parameter is the same as the first parameter.

Based on the foregoing embodiments, this application further provides a computer storage medium. The computer storage medium stores a computer program, and when the computer program is executed by a computer, the computer is enabled to perform the application display method provided in the foregoing embodiments.

An embodiment of this application further provides a computer program product, including instructions. When the computer program product runs on a computer, the computer is enabled to perform the application display method provided in the foregoing embodiments.

Embodiments of this application are described with reference to the flowcharts and/or block diagrams of the method, the device (system), and the computer program product according to embodiments of this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. An application display method, comprising:

detecting, by a first electronic device, a first operation;

sending, by the first electronic device, a first request message to a server based on the first operation, wherein the first request message comprises a first identifier that identifies a name of a requested layout of a first interface, and the first interface is an interface of a first application;

receiving, by the first electronic device, a first layout message that is sent by the server and that corresponds to the first identifier of the first interface, wherein the first layout message comprises a first layout text of the requested layout, where in the first layout text comprises a first parameter, and the first parameter is related to a parameter of the first electronic device; and displaying, by the first electronic device, the first interface based on the first layout message, wherein the displaying the first interface based on the first layout message comprises:

extracting a fixed field in the first layout text;

obtaining, by the first electronic device from the first electronic device, the parameter of the first electronic device corresponding to the fixed field in the first layout text;

obtaining a second layout text based on the first parameter and the obtained parameter of the first electronic device corresponding to the fixed field in the first layout text; and displaying, by the first electronic device, the first interface by using the second layout text.

2. The method according to claim 1, wherein the first parameter comprises at least one of the following parameters: a control type, a control width, a control height, a control border width, a page layout direction, a user interface display mode, a font scaling ratio, or a control position.

3. The method according to claim 1, wherein the parameter of the first electronic device comprises at least one of the following parameters: a screen width, a screen height, a left margin of a screen, or a right margin of the screen.

4. The method according to claim 1, wherein the first operation is an operation of opening the first application or a tap operation performed on a first link in a first application interface.

5. The method according to claim 1, wherein the first layout message further comprises a second parameter; and the method further comprises:

assigning, by the first electronic device, a value to the second parameter;

obtaining, by the first electronic device, a second layout message based on the second parameter; and displaying, by the first electronic device, the first interface based on the second layout message.

6. The method according to claim 1, wherein the first layout message further comprises a third parameter; and the method further comprises:

displaying, by the first electronic device, the first interface based on a second layout message, wherein the second layout message includes the third parameter.

7. The method according to claim 1, wherein a format of the first layout message is a JavaScript object notation (JSON) format or an extensible markup language (XML) format.

8. An application display method, comprising:

detecting, by a first electronic device, a first operation;

sending, by the first electronic device, a first request message to a server based on the first operation, wherein the first request message comprises a first identifier that identifies a name of a requested layout of a first interface, and the first interface is an interface of a first application;

receiving, by the server, the first request message sent by the first electronic device, and generating a first layout message based on the first request message, wherein the first layout message comprises a first layout text of the requested layout, and the first layout text is associated with the first identifier;

sending, by the server, the first layout message to the first electronic device, wherein the first layout message comprises a first parameter, and the first parameter is related to a parameter of the first electronic device;

receiving, by the first electronic device, the first layout message; and displaying, by the first electronic device, the first interface based on the first layout message, wherein the displaying the first interface based on the first layout message comprises:

extracting a fixed field in the first layout text;

obtaining, by the first electronic device from the first electronic device, the parameter of the first electronic device corresponding to the fixed field in the first layout text;

obtaining a second layout text based on the first parameter and the obtained parameter of the first electronic device corresponding to the fixed field in the first layout text; and displaying, by the first electronic device, the first interface by using the second layout text.

9. The method according to claim 8, wherein the first parameter comprises at least one of the following parameters: a control type, a control width, a control height, a control border width, a page layout direction, a user interface UI mode, a font scaling ratio, or a control position.

10. The method according to claim 8, wherein the parameter of the first electronic device comprises at least one of the following parameters: a screen width, a screen height, a left margin of a screen, or a right margin of the screen.

11. The method according to claim 8, wherein before the sending, by the server to the first electronic device, the first layout message corresponding to the first identifier of the first interface, the method further comprises:

obtaining, by the server, the first layout text; and pre-storing, by the server, the first layout text in the server based on the first identifier.

12. The method according to claim 8, wherein a format of the first layout message is a JavaScript object notation (JSON) format or an extensible markup language (XML) format.

13. The method according to claim 8, wherein the method further comprises:

detecting, by a second electronic device, a second operation;

sending, by the second electronic device, a third request message to the server based on the second operation, wherein the third request message comprises a second identifier of a second interface, and the second operation is an operation of opening a first application in the second electronic device;

receiving, by the server, the third request message sent by the second electronic device, and generating a third layout message based on the third request message, wherein the third layout message comprises the first layout text, and the first layout text is associated with the second identifier;

sending, by the server, the third layout message to the second electronic device, wherein the third layout message comprises a second parameter, the second parameter is related to a parameter of the second electronic device, and the second parameter is the same as the first parameter;

receiving, by the second electronic device, the third layout message; and displaying, by the second electronic device, the second interface based on the third layout message.

14. A first electronic device, wherein the first electronic device comprises a display; one or more processors; one or more memories; one or more sensors; a plurality of applications; and one or more computer programs; and the one or more computer programs are stored in the one or more memories, the one or more computer programs comprise instructions, and when the instructions are invoked and executed by the one or more processors, the first electronic device is enabled to perform the following steps:

detecting, by a first electronic device, a first operation;

sending, by the first electronic device, a first request message to a server based on the first operation, wherein the first request message comprises a first identifier of a first interface, and the first interface is an interface of a first application;

receiving, by the first electronic device, a first layout message that is sent by the server and that corresponds to the first identifier that identifies a name of a requested layout of the first interface, wherein the first layout message comprises a first layout text of the requested layout, where in the first layout text comprises a first parameter, and the first parameter is related to a parameter of the first electronic device; and displaying, by the first electronic device, the first interface based on the first layout message, wherein the displaying the first interface based on the first layout message comprises:

extracting a fixed field in the first layout text;

obtaining, by the first electronic device from the first electronic device, the parameter of the first electronic device corresponding to the fixed field in the first layout text;

obtaining a second layout text based on the first parameter and the obtained parameter of the first electronic device corresponding to the fixed field in the first layout text; and displaying, by the first electronic device, the first interface by using the second layout text.

15. The first electronic device according to claim 14, wherein the first parameter comprises at least one of the following parameters: a control type, a control width, a control height, a control border width, a page layout direction, a user interface display mode, a font scaling ratio, or a control position.

16. The first electronic device according to claim 14, wherein the parameter of the first electronic device comprises at least one of the following parameters: a screen width, a screen height, a left margin of a screen, or a right margin of the screen.

17. The first electronic device according to claim 14, wherein the first operation is an operation of opening the first application or a tap operation performed on a first link in a first application interface.

18. The first electronic device according to claim 14, wherein the first layout message further comprises a second parameter; and the steps further comprise:

assigning, by the first electronic device, a value to the second parameter;

obtaining, by the first electronic device, a second layout message based on the second parameter; and displaying, by the first electronic device, the first interface based on the second layout message.

19. The first electronic device according to claim 14, wherein the first layout message further comprises a third parameter; and the steps further comprise:

displaying, by the first electronic device, the first interface based on a second layout message, wherein the second layout message includes the third parameter.

20. The first electronic device according to claim 14, wherein a format of the first layout message is a JavaScript object notation (JSON) format or an extensible markup language (XML) format.

* * * * *